United States Patent [19]

Markis et al.

[11] Patent Number: 4,988,932

[45] Date of Patent: Jan. 29, 1991

[54] CONSTANT VELOCITY SERVOSYSTEM WTIH HIGH POSITIONAL ACCURACY

[75] Inventors: William R. Markis; James M. Papa; Michael T. Murray, all of Rochester, N.Y.

[73] Assignee: Eastman Kodak Company, Rochester, N.Y.

[21] Appl. No.: 419,171

[22] Filed: Oct. 10, 1989

[51] Int. Cl.$^5$ .............................................. G11B 21/10
[52] U.S. Cl. ................................... 318/560; 318/561; 318/608; 318/594; 318/632; 360/77.06; 360/77.16
[58] Field of Search ........................ 318/560, 561-632; 360/75-78

[56] References Cited

U.S. PATENT DOCUMENTS

| | | | |
|---|---|---|---|
| 3,728,607 | 4/1973 | Isak | 318/608 |
| 3,736,485 | 5/1973 | Scarrott et al. | 318/594 X |
| 4,200,827 | 4/1980 | Oswald | 318/594 X |
| 4,221,995 | 9/1980 | Barkman | 318/651 X |
| 4,282,469 | 8/1981 | Moriyama | 318/640 X |
| 4,296,443 | 10/1981 | Sakamoto et al. | 360/77.16 X |
| 4,312,033 | 1/1982 | Sweeney et al. | 364/167.01 |
| 4,365,324 | 12/1982 | Michaelis | 360/77.06 X |
| 4,368,412 | 1/1983 | Inoue | 318/632 |
| 4,386,306 | 5/1983 | Nishimura et al. | 318/601 X |
| 4,524,397 | 6/1985 | Chalmers et al. | 318/561 X |
| 4,613,916 | 9/1986 | Johnson | 318/640 X |
| 4,633,423 | 12/1986 | Bailey | 318/632 X |
| 4,669,359 | 6/1987 | Shiba | 318/593 X |
| 4,698,569 | 10/1987 | Kimura et al. | 318/567 |
| 4,795,955 | 1/1989 | Yamashita | 318/632 |
| 4,825,137 | 4/1989 | Nakajima et al. | 318/594 |
| 4,835,753 | 5/1989 | Yasuda | 318/599 X |
| 4,855,978 | 8/1989 | Kanamaru | 360/78.04 X |

Primary Examiner—Paul Ip
Attorney, Agent, or Firm—Edward Dugas

[57] ABSTRACT

The present servosystem positions a movable member such as an optical head over a rotating disk with a constant velocity and high positional accuracy by utilizing a fast analog feedback loop that is controlled by a slower digital loop. The analog feedback loop locks the speed of the movable member to the speed of the rotating disk in a spiral recording track. The progress of the movable member is constantly monitored with the digital loop. A velocity error of known magnitude and direction is introduced into the system. When the error exceeds a preset limit an error of the known magnitude but of the opposite direction is introduced. The servosystem thus zig-zags about the desired position with small velocity changes to provide a substantially constant velocity system with high positional accuracy.

7 Claims, 5 Drawing Sheets

CONSTANT VELOCITY SERVOSYSTEM WITH HIGH POSITIONAL ACCURACY

FIELD OF THE INVENTION

The present invention is directed to the field of positional servosystems and more particularly to a servosystem wherein a constant velocity movement is required while maintaining positional accuracy.

BACKGROUND OF THE INVENTION

In the optical disk art, an optical head is positioned radially over the recording track on the disk. In a manner similar to a phonograph record the optical head is used to track the spiral of a recording track. To format these disks, that is to install the servo tracks, the velocity of the arm supporting the optical head has to move at a velocity that is somewhat constant so that the track-to-track distance is held within 0.25 micron and the total accumulated positional error over the face of the optical disk (14") does not exceed 1 micron. This can be accomplished by providing a constant (within pre-established limits) velocity system while maintaining long term positional accuracy. Short term positional accuracy is relatively easy to maintain, given a constant velocity. All that is needed is a good, high bandwidth servosystem. The problem arises when long term accuracy must be maintained as well. If it can be argued that there is always a small velocity error even in a phase locked system, then it may also be argued that this error could result in a positional error which could accumulate while tracking a long spiral. The error could come from a number of sources: The scaling between the rotating member and the radial member might not be mathematically realizable to perfection, for example, or mechanical components may introduce the error. Once the error accumulates there is not much that can be done.

A patent of interest for its teachings is U.S. Pat. No. 3,504,362 entitled, "Digital Analog Condition Control Device: by H. Feldmann. In that patent, a movable element is advanced along a path with a substantially constant velocity. This is accomplished by providing replaceable programmed position signals towards which the movable element is driven. As the element approaches the next position a new position is fed to an arithmetic unit with the process continuing until the movable member reaches the desired position.

SUMMARY OF THE INVENTION

In the present invention a fast analog feedback loop is formed using a phase locked loop that is controlled by a slower but more accurate digital loop. The phase locked loop is used to lock the speed of a movable member to the speed of a rotating disk in a spiral recording track such that an optical head mounted on the movable member maintains its alignment with a high degree of accuracy. The progress of the movable member is monitored with the digital loop. When accumulated position error exceeds a preset limit, the movable member is adjusted to compensate. This compensation is handled in very small increments. The present invention does this by introducing a tiny velocity error of known magnitude and direction. The system is constantly checking to see if any of the position specifications are being approached. When a preset limit is reached (well within specifications), a new velocity with an error in the opposite direction is commanded. The servosystem thus "zig-zags"[in very small velocity changes. The velocity changes that are commanded are selected to be well within the "constant velocity" specification for the system.

From the foregoing, it can be seen that it is a primary object of the present invention to provide an improved constant velocity servosystem.

It is another object of the present invention to provide a system for maintaining an optical head centered on a desired spiral path over a recording medium without feedback information from the recording medium.

It is a further object of the present invention to provide a highly accurate velocity positioning system.

These and other objects of the present invention will become more apparent when taken in conjunction with the following description and drawings wherein like characters indicate like parts and which drawings form a part of the present description.

DESCRIPTION OF THE PREFERRED EMBODIMENT

Figure 1:
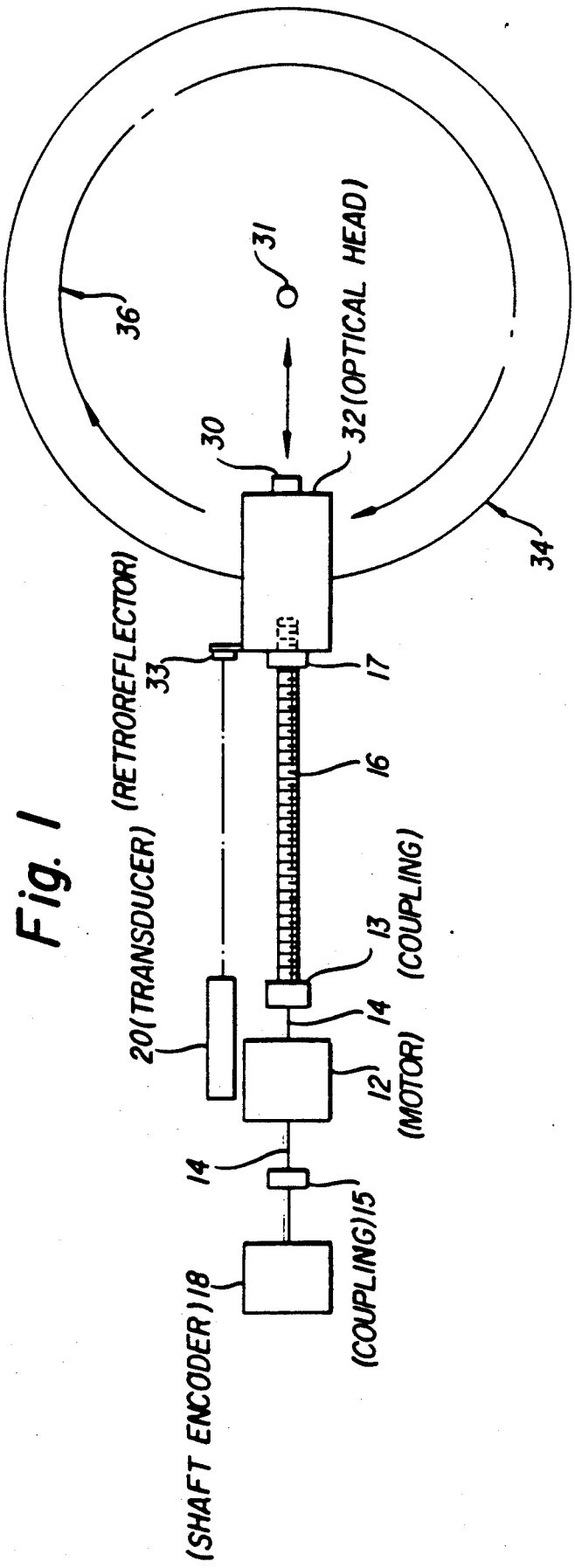
FIG. 1 illustrates an apparatus for forming spiral tracks on a rotating disk.

Referring to FIG. 1, an optical disk 34 is shown with a spiraling track 36 that is to be laid down (formatted) and on which may be recorded data that can be read by an optical head 30 positioned over the track 36. The optical head 30 is, in turn, part of the optical head assembly 32. The optical head assembly 32 is attached to a ballnut 17 which, in turn, is moved linearly by the rotary motion of a ballscrew 16. The ballscrew 16 is coupled to a drive motor shaft 14 via a flexible coupling 13. Attached to the opposite end of the drive motor shaft 14 is a second flexible coupling 15, which couples the optical shaft encoder 18 to the motor shaft 14. A position transducer, consisting of an interferometer laser and electronics 20 and a retroreflector 33 provide precise position information such as a position up count or position down count signal (see FIG. 3).

In operation of the system thus far described, the drive motor 12, by rotating shaft 14 in a desired direction, can move the optical head 30 along a radial path on the optical disk 34. The position of the optical head 30 is locked to the rotational position of the optical disk 34. As previously stated, it is desired to create tracks 36 on the optical disk 34 in a spiral fashion. The nominal pitch of the tracks 36 is 1.8 micron with a short term tolerance of 0.25 microns.

Figure 2:
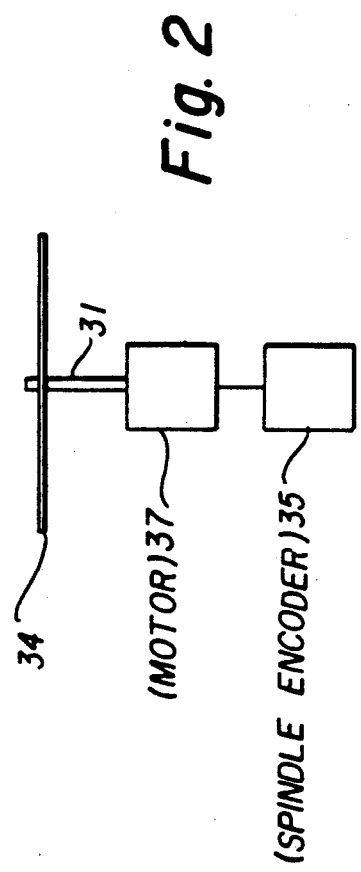
FIG. 2 illustrates the drive apparatus for rotating the disk.

FIG. 2 illustrates the apparatus for rotating the optical disk 34. A spindle motor 37 rotates the disk 34 via a spindle 31 and provides signals that are a function of the disk's rotation via a spindle encoder 35.

Figure 3:
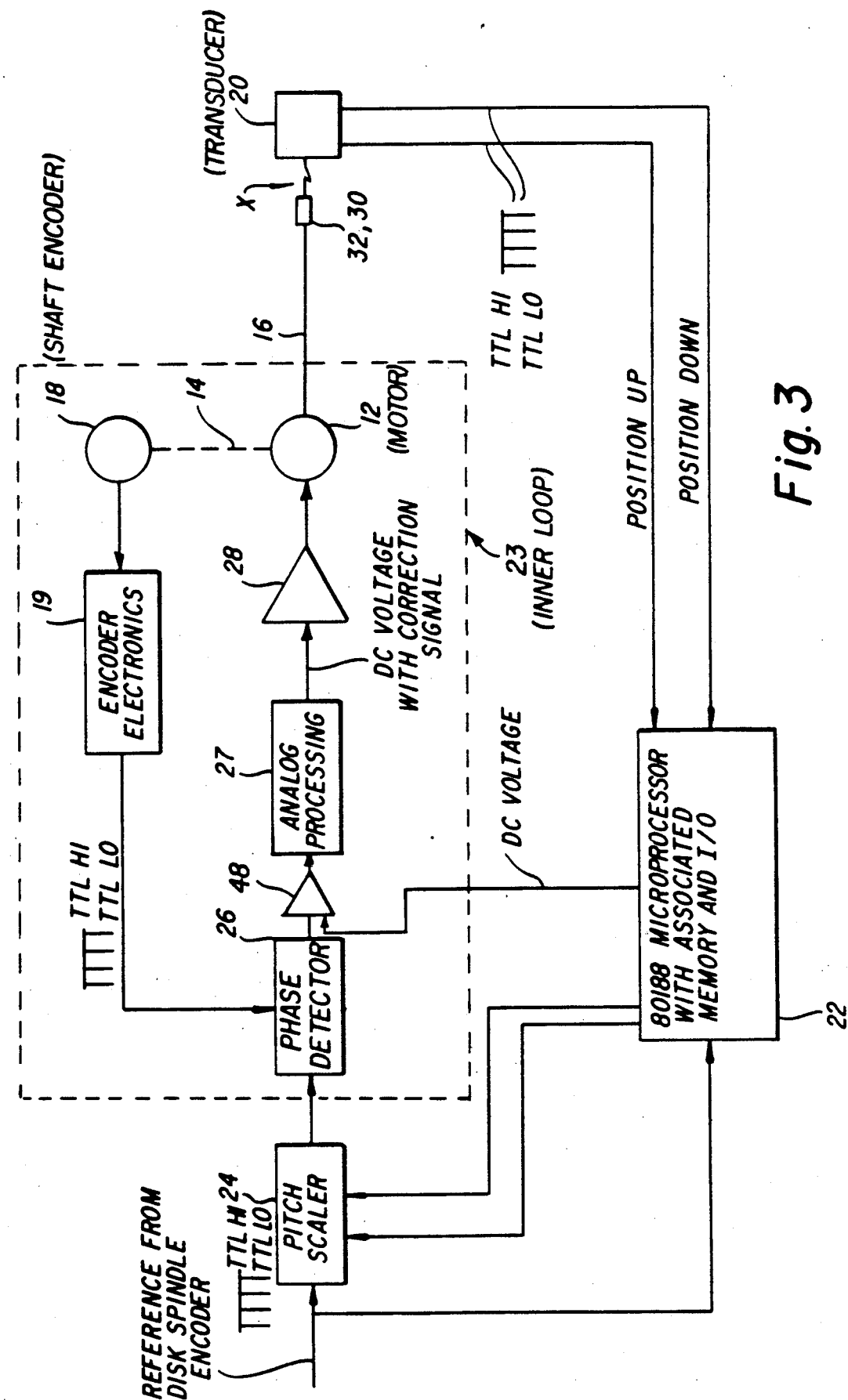
FIG. 3 is a block schematic diagram of the preferred embodiment of the invention.

Referring to FIG. 3, two control loops are provided—an inner loop 23 is a phase locked loop that is formed by blocks 26, 27, 28, 12, 18, and 19. The outer loop consists of the inner loop 23 plus 16, 20, 22, and 24. In the inner loop 23, a phase detector 26 takes a reference input signal from a pitch scaler 24 and a feedback input signal from an encoder electronics 19. This portion of the system operates as a phase locked control loop and is well known in the art.

The output signal from the phase detector 26 is directed to an input of a summer 48. The summer 48 also receives a DC signal, which is a function of velocity, from a microprocessor 22. The output signal from summer 48 is directed to the input of an analog processor 27 and from there, is amplified in a motor driver circuit 28 to apply the proper driving current to the motor 12 to drive the ballscrew 16 and the rotary encoder 18 through shaft 14. The signals from the rotary encoder 18 are processed in the encoder electronics 19 to provide a feedback signal to the phase detector 26. In the preferred embodiment the motor 12 is an inland model 2109 and the rotary encoder 18 is a Teledyne Gurley 8335 series.

The analog processing circuits 27 consist of an error amplifier and a compensation circuit (not shown for purpose of simplicity). The input is the output of the phase detector 26 and is a small DC voltage The error amplifier amplifies the small DC voltage and the compensation circuit is included in order to achieve the proper phase margin as is well known in the art.

Figure 4:
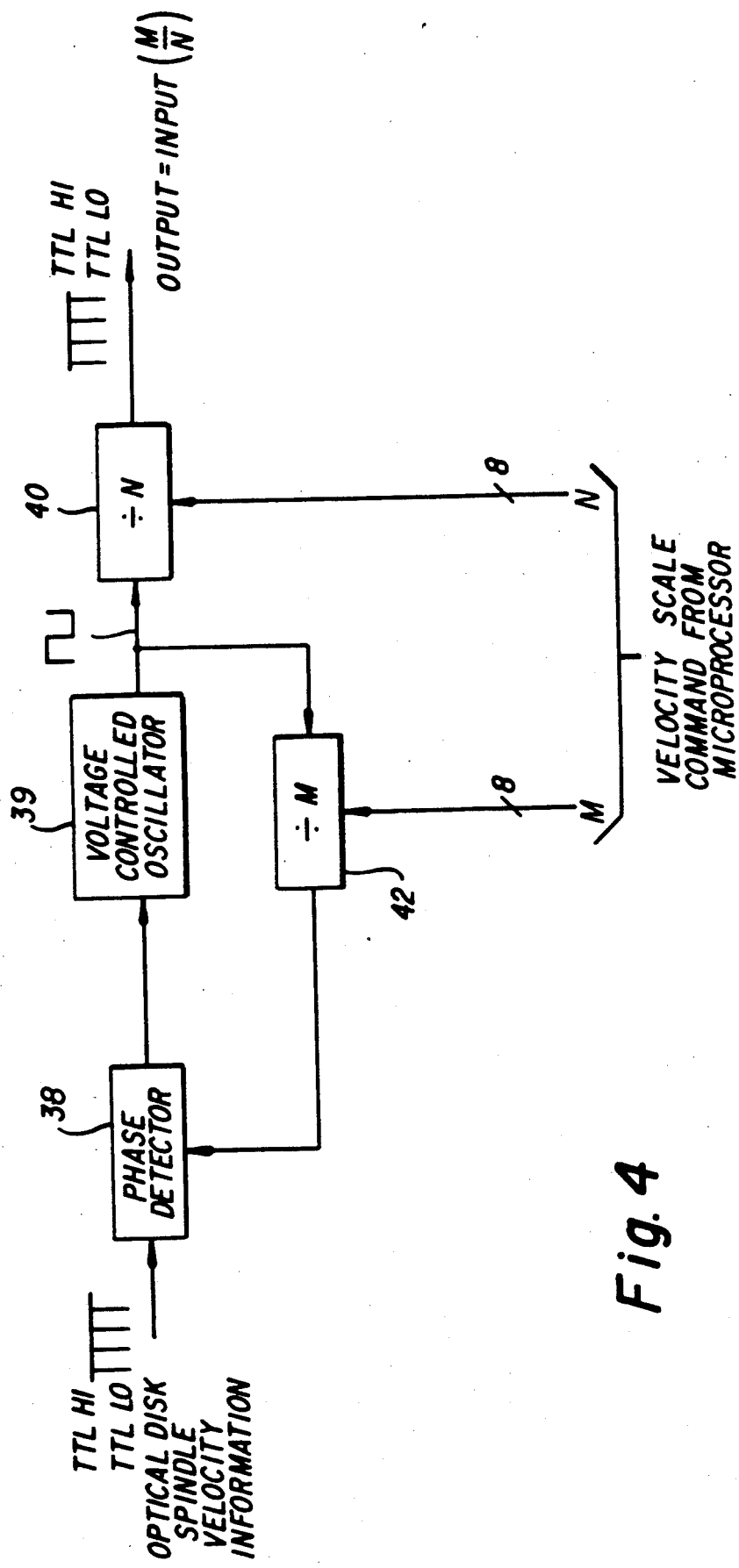
FIG. 4 is a block diagram of a pitch scaler.

Referring to FIG. 4 wherein is illustrated the block diagram of the pitch scaler 24, a voltage controlled oscillator 39 is phase locked to a pulse stream from the spindle encoder 35. The output from the VCO 39 is routed to a phase detector 38 via an "M" divider 42. Since the 2 inputs to the phase detector 38 must be of equal frequency and phase, the output from the VCO 39 is "M" times the input frequency. The output of the VCO 39 also is passed to an "N" divider 40. Since divider 40 is in the forward path, the output is the VCO frequency divided by N. Thus the entire pitch scaler 24 performs an M/N operation on the spindle encoder frequency. The quantities "M" and "N" are generated by the microprocessor 22 and form the basis of control for the outer loop.

Figure 5:
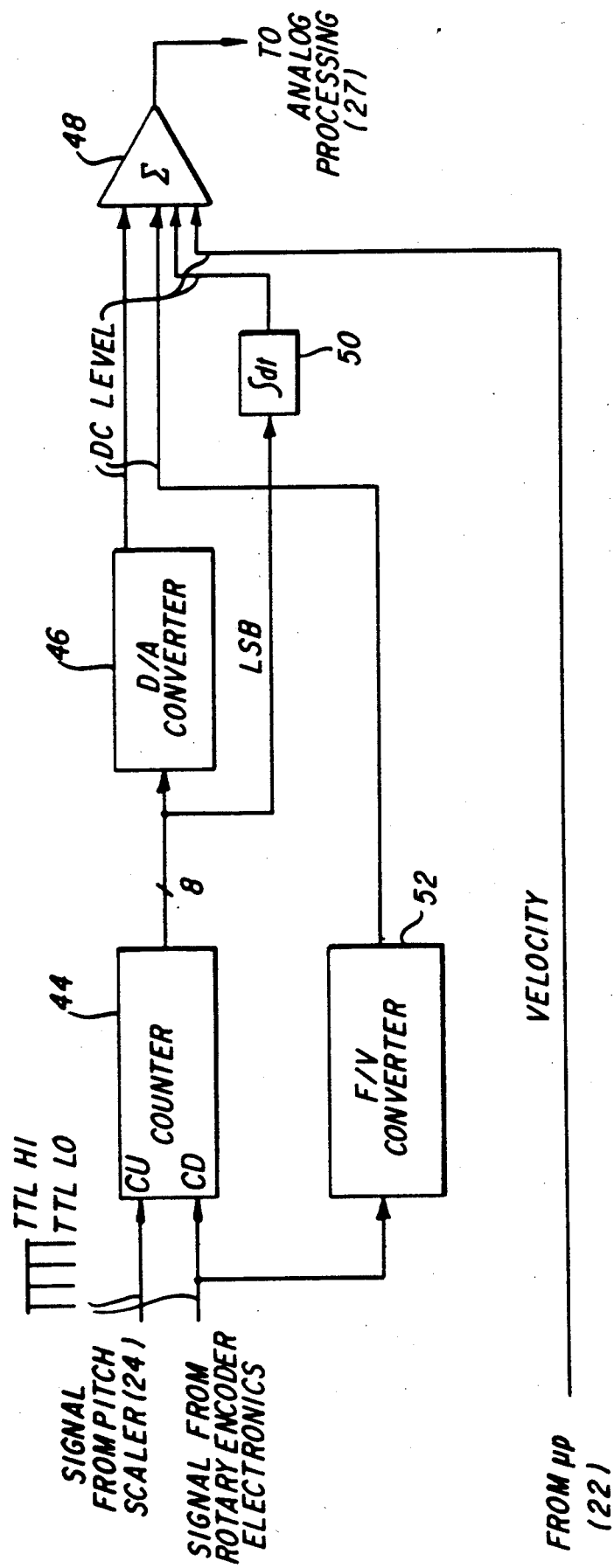
FIG. 5 is a block diagram of a phase locked loop.

Referring to FIG. 5 the operation of the phase locked loop 23 is described: The output from the pitch scaler 24 is applied to the count up CU terminal of a counter 44, while the output from the rotary encoder electronics 19 is applied to the count down CD terminal. The counter 44 outputs 8 bits which are converted to an analog signal by a D/A converter 46. The analog signal is applied to an input to the summer 48. It can be seen that when the frequency of the signal from the pitch scaler 24 is higher than that from the rotary encoder electronics 19, the voltage from the D/A converter 46 will be higher than when the two frequencies are equal. An equilibrium count in the counter 44 will only be reached when there is a down count (from 19) for every up count (from 24). The pulse stream from the rotary encoder electronics 19 is also applied to the frequency-to-voltage (F/V) converter 52. This generates a velocity proportional signal and is used for rate dampening compensation. The third input to the summer 48 is from an integrator 50. This circuit integrates the least significant bit (LSB) from the counter 44. The purpose of this is to force the LSB to a 50% duty cycle in order to prevent false counting due to a simultaneous count up and count down condition at the counter's input. By forcing a 50% duty cycle, the inputs are forced to be out of phase. The fourth input to the summer 48 is the velocity command from the microprocessor 22. This DC level signal is used, primarily, to move the system into position before lock is achieved. The output from the phase detector 26 is a DC level signal which is proportional to the difference in phase and frequency between the signal from the pitch scaler 24 and the signal from the rotary encoder electronics 19.

Figure 6:
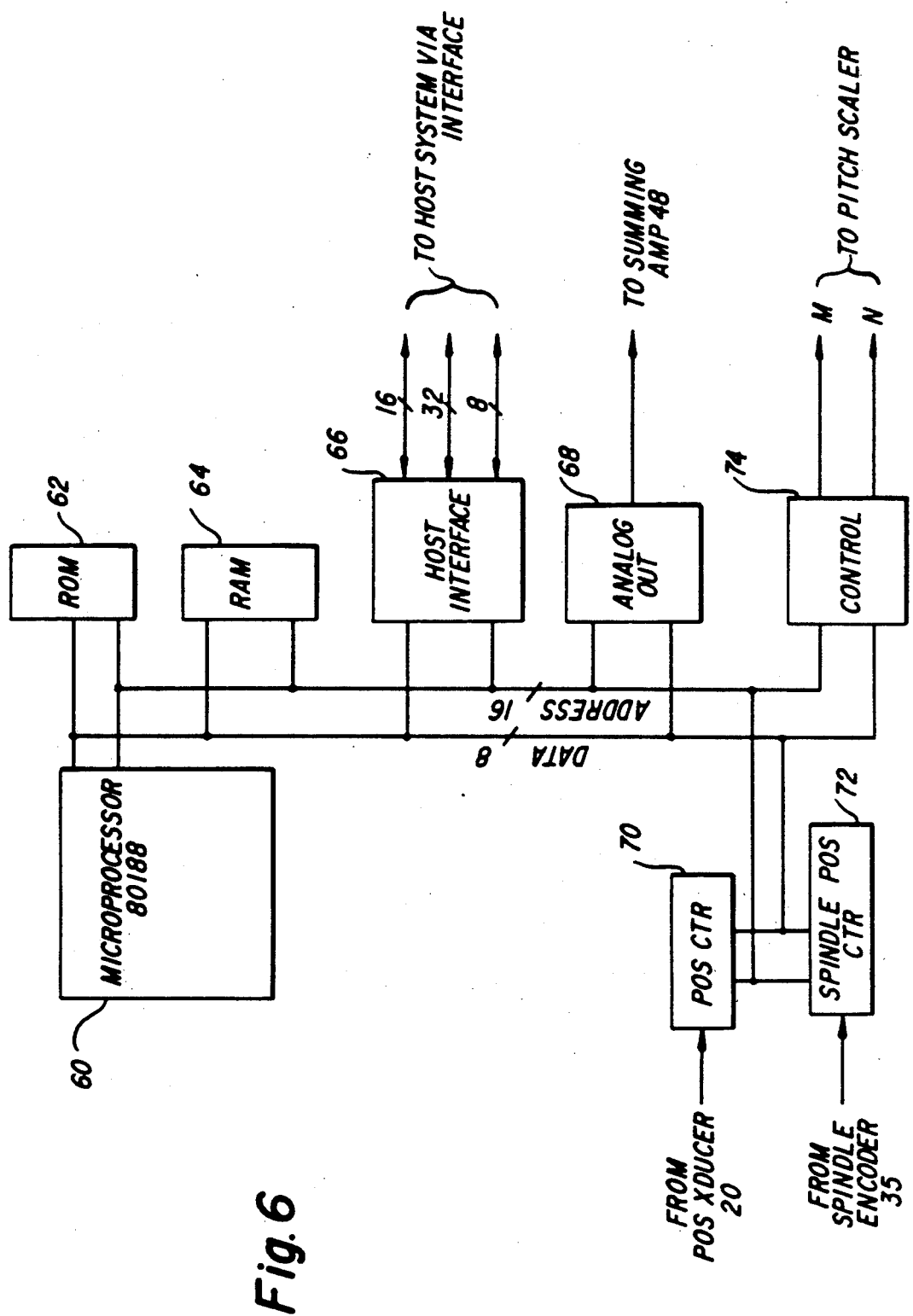
FIG. 6 is a block diagram of a microprocessor system, including position counters.

Referring to FIGS. 3 and 6, the outer loop consists of the position transducer 20, the microprocessor system 22 and the previously described pitch scaler 24. The position transducer 20 constantly provides precise position information to the microprocessor 22. This information is in the form of velocity proportional pulses which are counted by the 24 bit position counter 70. Simultaneously, the spindle position counter is totalizing the output from the disk spindle encoder 35. The totalized disk spindle encoder signal represents the accumulated angular position of the spindle 31 and disk 34.

The operation of the microprocessor 22 in the active servo mode is thus: The microprocessor 22 calculates two velocities based on the inputted desired track pitch and spindle speed information. One of the two velocities is very slightly higher than that which would yield the desired pitch, the other is slightly lower. The system finds the start of the spiral track by servoing in velocity mode only (phase locked loop 23 is disabled) first to a known reference then to the start of the spiral. Upon embarking on the spiral, the microprocessor selects one of the two calculated velocities and activates the phase locked loop 23. The microprocessor is constantly comparing the actual optical head 30 position with a position calculated from the angular position of the spindle 31. Since the actual velocity is either slightly greater or lesser than the desired velocity there will be a small accumulated error. When the accumulated error becomes a significant portion of the allowed short term error, the microprocessor 22 will change the velocity to the other calculated value. Since the second calculated value has an error that is of approximately the same magnitude as the first value but of opposite direction, the position will tend to accumulate toward the opposite error limit. As the error limits are approached, the microprocessor 22 will select the calculated velocity which will cause the optical head 30 to move toward the opposite error limit. If these error limits are made narrow enough, the optical head 30 velocity and the short term position error can be kept within the system specification. Since long term errors are prevented from accumulating, the long term specifications can be met as well.

The microprocessor 22, in addition to being part of the outer loop, also serves as the host interface via interface block 66 and changes the state of the servosystem. The state changes are necessary in order to position the optical head 30 prior to formatting and to retract the head after formatting. The configuration of the microprocessor system 22 is somewhat standard. An Intel 80188 chip is used as the processor. The configuration is the standard bus, with ROM 62 and RAM 64. 24 bit counters 70, 72 are maintained on the bus to keep a count of optical head 30's position and disk 34's angular position. A control port 74 performs control over pitch as well as the servo state. An analog output port 68 provides motor drive when the system is not in lock.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

We claim:

1. A constant velocity servosystem comprising:
a first movable member;
motor means for providing motion to said first movable member;
position transducer means for providing a position signal indicative of the position of said first movable member;
first encoder means coupled to said motor means for providing a first encoder signal indicative of the motion of said motor means;
a second movable member;
second encoder means coupled to said second movable member for providing a second encoder signal indicative of the position of said second movable member;
a phase locked loop means for receiving said first and said second encoder signals for providing a drive signal for controlling the motion of said motor means as a function of the difference between said first and said second signals;
computer means receiving as inputs said position signal from said position transducer means and said second encoder signal and data representing a desired path of said first movable member with respect to said second movable member, for computing a first path and a second path which lie on either side of the desired path, said computer means referencing the signals on its inputs determining the position of said first movable member with reference to said first and second paths to provide a correction signal of a first magnitude and direction when approaching said first path and of a first magnitude and opposite direction when approaching said second path; and
means for applying said provided correction signal to said phase locked loop means for incorporation into said drive signal.

2. A constant velocity servosystem according to claim 1 wherein said phase locked loop means is comprised of:
counter means having a count up and a count down input for receiving said first encoder signal on said count down input and said second encoder signal on said count up input and providing at its output a signal indicative of the cumulative count;
frequency-to-voltage converter means for receiving said first encoder signal and for providing a signal at its output which is a function of the frequency of said first encoder signal; and
means for summing the output signal from said counter means with the output of said frequency-to-voltage converter means.

3. A constant velocity servosystem according to claim 1 and further comprising:
a scaler means interposed between the input of said phase locked loop means and the output of said second encoder means for adjusting the scale of the provided drive signal as a function of said correction signal.

4. A constant velocity servosystem according to claim 3 wherein said scaler means is comprised of:
a phase detector having an input connected to receive said second encoder signal and an input for receiving a feedback signal to provide a voltage signal indicative of the difference between the signals on said inputs:
a voltage controlled oscillator providing a binary output signal having a frequency that is a function of the level of the difference signal from said phase detector;
a first divider receiving the binary output signal from said voltage controlled oscillator for dividing the output by an integer M to provide the feedback signal to said phase detector; and
a second divider receiving the binary output signal from said voltage controlled oscillator for dividing the output by an integer N to provide the input to said phase locked loop means.

5. A constant velocity servosystem according to claim 4 wherein said first and said second divider receive the integer values M and N respectively, from said computer means as said correction signal.

6. A constant velocity servosystem according to claim 1 wherein said computer means incorporates;
a first position counter for counting transitions of the position signal for determining the position of said first member; and
a second position counter for counting the transitions of said second encoder signal for determining the position of said second member.

7. A constant velocity servosystem according to claim 1 wherein said second movable member is a rotatable disk and said second encoder means is coupled to said disk so as to provide signals that are a function of the rotational positions of said disk.

* * * * *